United States Patent [19]
Shieh

[11] Patent Number: 5,736,924
[45] Date of Patent: Apr. 7, 1998

[54] ALARM LOCK

[76] Inventor: Jin-Ren Shieh, No. 178, Shih Chia Rd., Taichung, Taiwan

[21] Appl. No.: 522,659

[22] Filed: Sep. 1, 1995

[51] Int. Cl.$^6$ ............................................. B60R 25/10
[52] U.S. Cl. .......................... 340/426; 340/432; 340/691; 340/825.48; 340/542; 340/571
[58] Field of Search .................... 340/426, 432, 340/691, 825.48, 542, 571, 427, 652

[56] References Cited

U.S. PATENT DOCUMENTS

| | | | |
|---|---|---|---|
| 3,781,861 | 12/1973 | Adler, Jr. et al. | 340/427 |
| 4,057,986 | 11/1977 | Zolke et al. | 70/233 |
| 4,663,611 | 5/1987 | Humphrey | 340/542 |

*Primary Examiner*—Jeffery Hofsass
*Assistant Examiner*—Daniel J. Wu

*Attorney, Agent, or Firm*—Browdy and Neimark

[57] ABSTRACT

An alarm lock comprises a main body, a lock core and an alarm device. The main body is provided with a first axial hole and a second axial hole. The lock core has a body capable of a reciprocating motion in the first axial hole. The lock core further has a lock bolt, a locating member and a locating portion. The lock bolt is capable of a reciprocating motion along with the body while the locating member and the locating portion are intended for locating the lock core. The alarm device is disposed in the main body which is further provided with a third axial hole in which a connection member is disposed slidably. The lock bolt is provided with a driving section which is in turn provided peripherally with a first driving portion, a second driving portion, and a third driving portion. The lock bolt is rotated by a key so as to alter the contact areas between the connection member and the driving portions for locking the alarm lock, with or without the alarm device being ready to trigger when the alarm lock is unlocked.

6 Claims, 2 Drawing Sheets

5,736,924

ALARM LOCK

FIELD OF THE INVENTION

The present invention relates generally to a lock, and more particularly to a disk brake lock having an alarm device.

BACKGROUND OF THE INVENTION

The theft-prevention of a vehicle is generally attained by an alarm device driven by the electric current or a key-operated lock. The current-driven alarm device is quite effective in preventing the theft of the vehicle provided with such current-driven alarm device. However, the wiring system of the current driven alarm device is generally not protected by a housing and is therefore vulnerable to sabotage. The key-driven lock is provided with a rigid protective housing and is therefore less vulnerable to sabotage; nevertheless it is not provided with an alarm device designed to warn of a theft under way.

SUMMARY OF THE INVENTION

It is therefore the primary objective of the present invention to provide an alarm lock comprising an alarm device designed to warn of theft in progress.

It is another objective of the present invention to provide an alarm lock comprising a protective means to prevent sabotage.

It is still another objective of the present invention to provide an alarm lock which can be operated by a key, with or without the cooperation of the alarm device of the alarm lock.

The foregoing objectives of the present invention are attained by the alarm lock, which comprises a main body, a lock core, and an alarm device. The main body is provided with a first axial hole and a second axial hole. The lock core has a body capable of a reciprocating motion in the first axial hole. The lock core further has a lock bolt, and a locating pin 44. The lock bolt is capable of a reciprocating motion along with the body from a first open position to a locked position where the locating pin moves into a locating hole in the main body. The alarm device is disposed in the main body which is further provided with a third axial hole in which a connection member is disposed slidably. The lock bolt is provided with a driving section which is in turn provided peripherally with a first driving portion, a second driving portion, and a third driving portion. The lock bolt is rotated by a key so as to alter the contact areas between the connection member and the driving portions for locking the alarm lock, with or without the alarm device being ready to trigger when the alarm lock is unlocked.

DETAILED DESCRIPTION OF THE INVENTION

Figure 1:
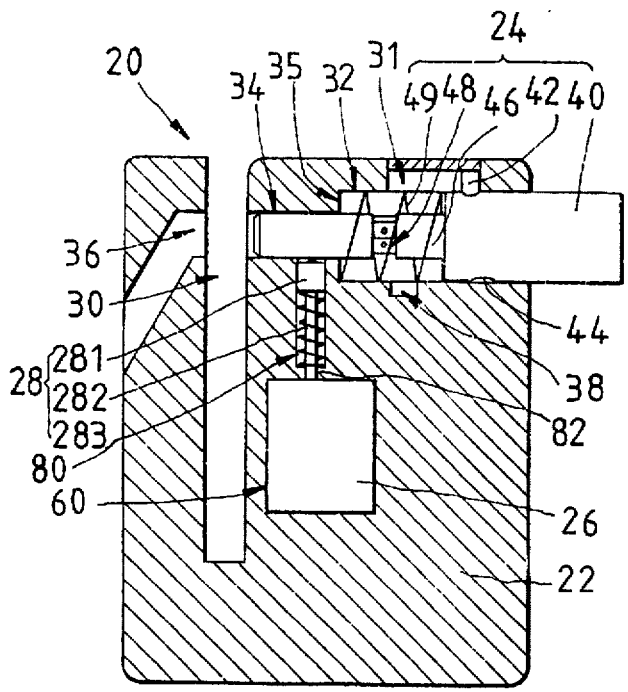
FIG. 1 is a sectional view of a first preferred embodiment of the present invention and showing that the lock core is located at a first position.
Figure 2:
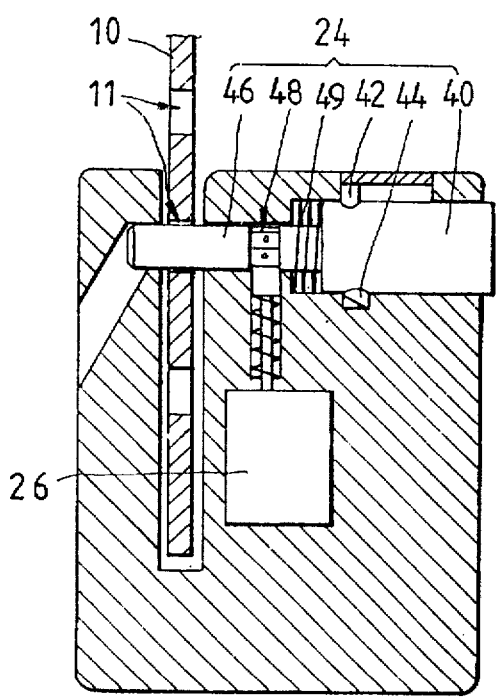
FIG. 2 is a sectional view of the first preferred embodiment of the present invention and showing that the lock core is located at a second position.
Figure 3:
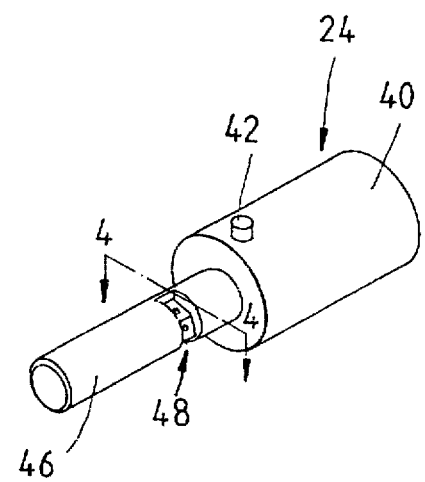
FIG. 3 shows a perspective view of the lock core of the first preferred embodiment of the present invention.
Figure 4:
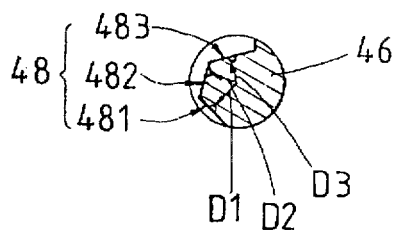
FIG. 4 shows a sectional view of a portion taken along the line 4—4 as shown in FIG. 3.

As shown in FIGS. 1–4, an alarm lock 20 of the first preferred embodiment of the present invention is intended for use in disabling a disk brake 10 of the motorcycle and is composed of a main body 22, a first lock core 24, an alarm device 26, and a connection member 28.

The main body 22 is provided with a slot 30 extending downwards from the top thereof; a first axial hole 32 extending leftwards from the rightside thereof; a second axial hole 34 coaxial with the first axial hole 32 and extending rightwards from the inner wall of the right side of the slot; a stepped portion 35 located between the first axial hole 32 and the second axial hole 34; a first locating hole 36 extending leftwards first from the inner wall of the left side of the slot 30 and then extending downwards in an inclined manner to pass through the left side of the main body 22; and a second locating hole 38 of a recessed construction and extending downwards from the inner wall of the first axial hole 32 into the main body 22. The first axial hole 32 is in communication with the second axial hole 34. The first axial hole 32 is provided on the inner wall thereof with a guide slot 31 extending in the direction of the axis of the first axial hole 32.

The first lock core 24 has a first body 40 which is disposed slidably in the first axial hole 32. The first lock core 24 further has a locating pin 42, a first retaining pin 44, a first lock bolt 46, and a first retrieving spring 49. The locating pin 42 is fastened with the first body 40. The first retaining member 44 is movably disposed on the underside of the body 40 into said locating hole 38 disposed on the inner wall of the first axial hole 32 when lock core 24 is moved from a first open position (FIG. 1) to a second closed position (FIG. 2) engaging lock bolt 46 in first locating hole 36. The first lock bolt 46 is disposed on the left side of the first body 40 such that the first lock bolt 46 can be moved between the second axial hole 34 and the locating hole 36. The first retrieving spring 49 is received in the first axial hole 32 such that the first retrieving spring 49 is fitted over the first lock bolt 46 and that both ends of the first retrieving spring 49 urge respectively the first body 40 and the stepped portion 35. The first lock bolt 46 has a first driving section 48, which is located in the second axial hole 34 and is equal in outer diameter to the first lock bolt 46. The first driving section 48 is provided peripherally with a first driving portion 481, a second driving portion 482, and a third driving portion 483, which are of a recessed construction and are adjacent to one another.

The alarm device 26 is disposed in a receiving compartment 60 of the main body 22.

The connection member 28 is disposed in a third axial hole 80 of the main body 22. The third axial hole 80 is located between the second axial hole 34 and the receiving compartment 60. The second axial hole 32 is provided therein with a protuberance 82. The alarm device 26 is so disposed that a microswitch 60 of the alarm device 26 is in communication with the bottom of the third axial hole 80. The connection member 28 has a head end 281 and a tail end 282 which is fitted over with a coil spring 283 urging respectively at both ends thereof the head end 281 and the protuberance 82. The head end 281 is forced by one end of the coil spring 283 to extend out of the third axial hole 80 to urge the first lock bolt 46.

In operation, the motorcycle disk brake 10 is disposed in the slot 30 before the first open lock core 24 is pushed from the first position (FIG. 1) to the second closed position (FIG. 2) in conjunction with the locating pin 42 and the guide slot 31. The first retaining pin 44 is movably inserted into the second locating hole 38 when the lock core 24 is moved from the first open position to the second closed position. In the meantime, the first lock bolt 46 is actuated to move by the first body 40 such that one end of the first lock bolt 46 is put through a heat-radiating hole 11 of the disk brake 10 so as to engage the locating hole 36. The disk brake 10 is thus retained securely.

When the first lock bolt 46 is moved leftwards to locate at the second locked position, the first driving section 48 of the first lock blot 46 is caused to urge the head end 281 of the connection member 28. The axis of the first lock bolt 46 is spaced respectively from the first, the second and the third driving portions 481,482 and 483 by three different distances $D_1$, $D_2$ and $D_3$. As a result, the tail end 282 of the connection member 28 is forced respectively by the three driving portions 481, 482 and 483 to press the alarm device 26 into different positions which bring about the locking of the alarm lock 20 without making the alarm device 26 ready to trigger, the locking of the alarm lock 20 and the making of the alarm device 26 ready to trigger, or the unlocking of the alarm lock 20 and the closing of the circuit of the alarm device 26.

Prior to the operation, the first lock bolt 46 is first turned by a key to select the position of the alarm device 26 intended before the first lock core 24 is pressed. However, the first lock core 24 may be first pressed to the second locked position before the first lock bolt 46 is turned to make such selection.

Figure 5:
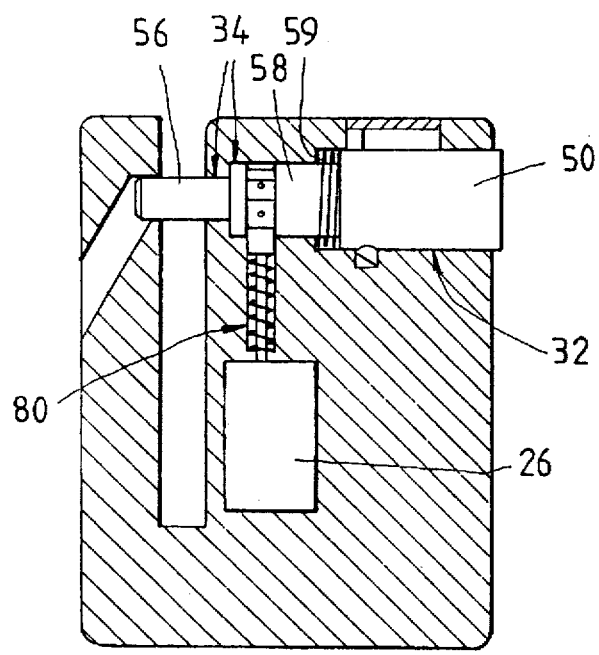
FIG. 5 is a sectional view of a second preferred embodiment of the present invention and showing that the lock core is located at a first position.
Figure 6:
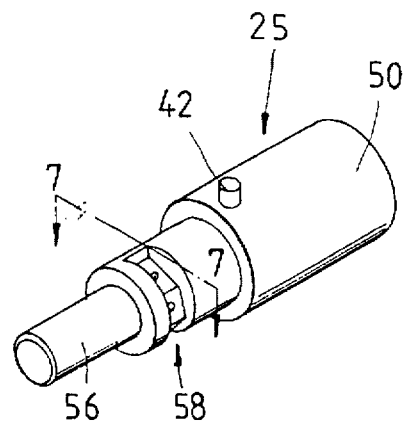
FIG. 6 shows a perspective view of the lock core of the second preferred embodiment of the present invention.
Figure 7:
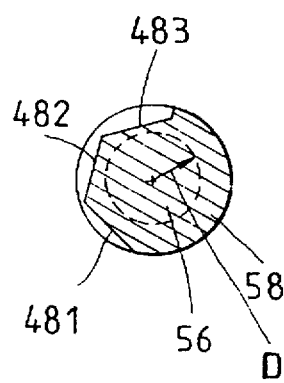
FIG. 7 shows a sectional view of a portion taken along the line 7—7 as shown in FIG. 6.

As shown in FIGS. 5–7, the second preferred embodiment of the present invention comprises a second lock core 25 capable of triggering the alarm device 26. The second lock core 25 has a second body 50, a second lock bolt 56 and a second retrieving spring 59. The second lock bolt 56 is located in the second axial hole 34 and is provided with a second driving section 58 having an surface spaced from the axis of lock bolt 56 a distance greater than the radius D of the second lock bolt 56 (see FIG. 7). The second driving section 58 is provided thereon with the first, the second and the third driving portions 481, 482 and 483. As shown in FIG. 7, smallest distance between the axis of the second lock blot 56 and the three driving portions 481, 482 and 483 is greater than the radius D of the second lock bolt 56. For improving the moving stability of the second lock bolt 56, the second axial hole 34 is provided therein with two sections equal in length and different in inner diameter. The third axial hole 80 is located between the second axial hole 34 and the alarm device 26.

Figure 8:
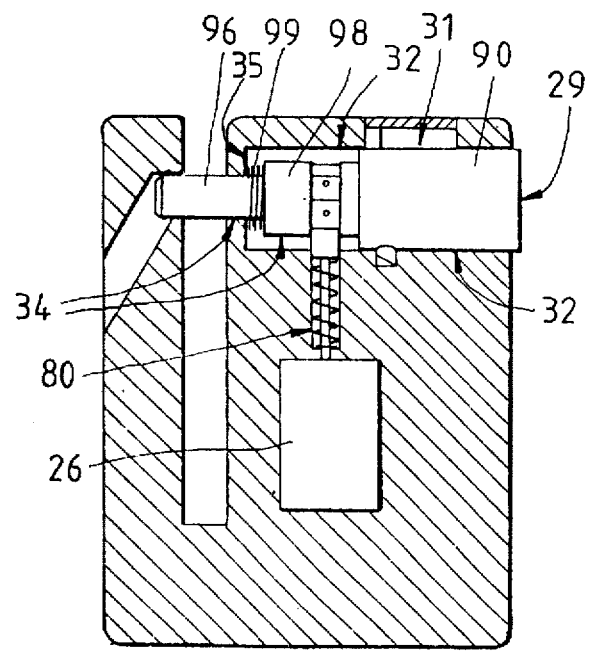
FIG. 8 is a sectional view of a third preferred embodiment of the present invention and showing that the lock core is located at a first position.

As shown in FIG. 8, the third preferred embodiment of the present invention comprises a third lock core 29 having a third body 90, a third lock bolt 96 and a third retrieving spring 99. The third lock bolt 96 is provided with a third driving section 98 having an outer diameter greater than the outer diameter of the third lock bolt 96. The third driving section 98 is located in the first axial hole 32. The third retrieving spring 99 has two ends urging respectively the stepped portion 35 and one end of the third driving section 98. The third axial hole 80 is located between the first axial hole 32 and the alarm device 26.

What is claimed is:

1. An alarm lock comprising:
   a main body having coaxially a first axial hole, a second axial hole and a locking hole;
   a lock core having a body, a lock bolt, and a locating pin, said body disposed in said first axial hole such that said body is capable of moving back and forth in said first axial hole, said lock body located in said second axial hole such that said lock bolt is capable of moving back and forth in said second axial hole along with said body to permit said locating pin to engage in said locating hole to locate said lock core in said main body;
   a biasing means disposed in said main body to urge said lock core; and
   an alarm device disposed in said main body;
   wherein said main body further comprises a third axial hole located between said alarm device and said first axial hole, or between said alarm device and said second axial hole, said third axial hole provided therein with a connection member capable of sliding in the direction of an axis of said third axial hole;
   wherein said lock bolt is provided thereon with a driving section having peripherally a first driving portion, a second driving portion and a third driving portion, which are in selective contact with said connection member and are respectively spaced from an axis of said lock bolt by different distances;
   wherein said lock bolt is rotated by a key of an alarm lock so as to cause a change in a contact position between said driving section and said connection member for locking said alarm lock, with or without said alarm device being ready to trigger when said alarm lock is unlocked.

2. The alarm lock as defined in claim 1, wherein said main body has a slot dimensioned to receive therein a motorcycle disk brake to be disabled, said slot provided on an inner wall thereof with a locating hole.

3. The alarm lock as defined in claim 1, wherein said third axial hole is in communication with said first axial hole and said second axial hole perpendicularly.

4. The alarm lock as defined in claim 1, wherein said driving section has an outer surface spaced from an axis of said lock bolt a distance less than the radius of said lock bolt.

5. The alarm lock as defined in claim 1, wherein said driving section has an outer surface spaced from an axis of said lock bolt a distance greater than the radius of said lock bolt.

6. The alarm lock as defined in claim 1, wherein one of said first driving portion, said second driving portion and said third driving portion is spaced from an axis of said lock bolt by a distance which is smaller than the radius of said lock bolt.

* * * * *